3 Sheets—Sheet 1.
G. W. CORNELL.
REFRIGERATING CHAMBERS.
No. 194,414. Patented Aug. 21, 1877.
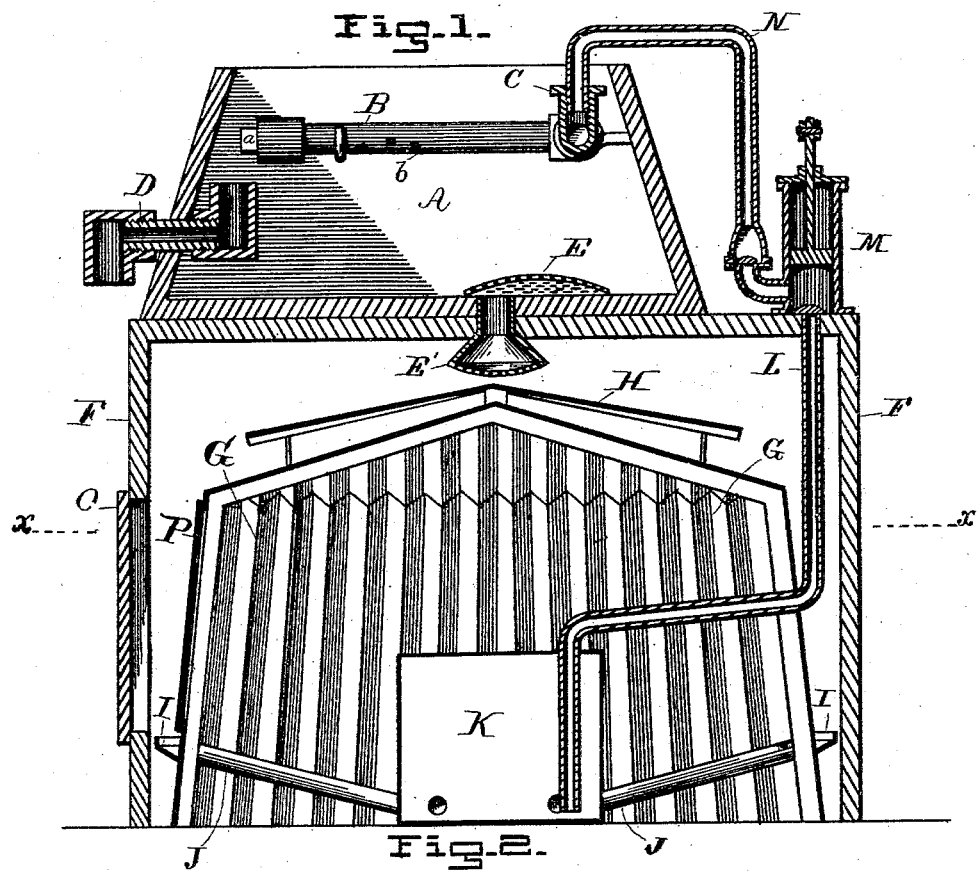
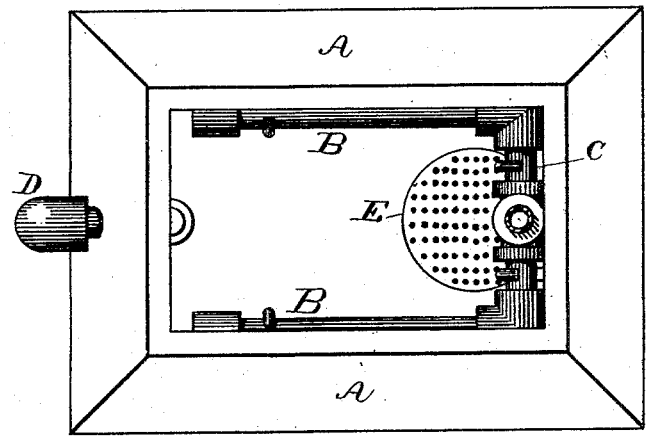
WITNESSES:
Jas. F. DuHamel
Albin H. Long
INVENTOR
Geo. W. Cornell
PER
H. S. Abbot.
ATTORNEY.

3 Sheets—Sheet 2.

G. W. CORNELL.
REFRIGERATING CHAMBERS.

No. 194,414. Patented Aug. 21, 1877.

WITNESSES:
Jas. F. DuHamel
Albin M. Long

INVENTOR:
Geo. W. Cornell
PER
H. S. Abbot.
ATTORNEY.

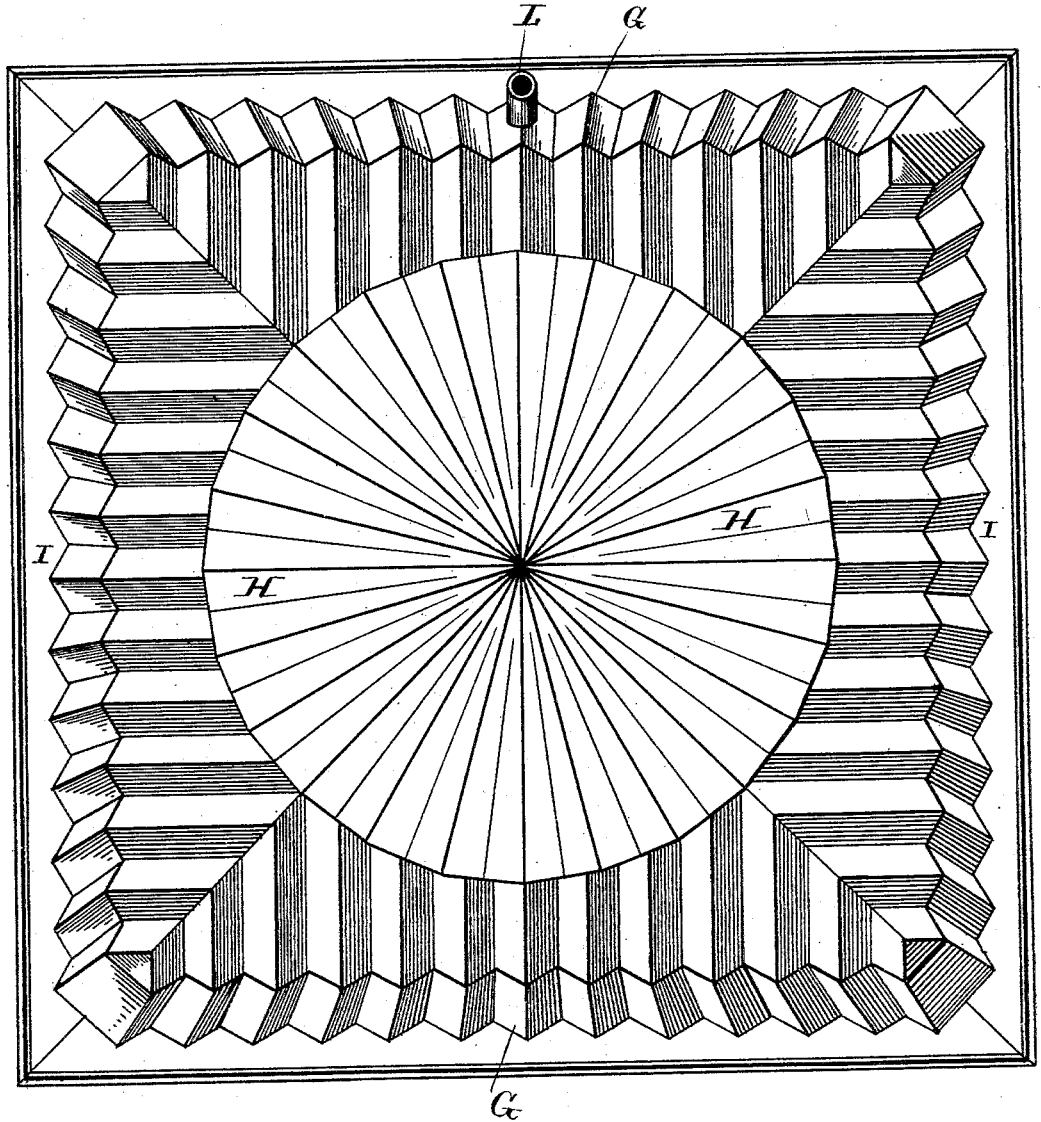

UNITED STATES PATENT OFFICE.

GEORGE W. CORNELL, OF JERSEY CITY, NEW JERSEY.

IMPROVEMENT IN REFRIGERATING-CHAMBERS.

Specification forming part of Letters Patent No. 194,414, dated August 21, 1877; application filed July 20, 1877.

*To all whom it may concern:*

Be it known that I, GEO. W. CORNELL, of Jersey City, in the county of Hudson and State of New Jersey, have invented certain new and useful Improvements in Refrigerating-Chambers; and I do hereby declare that the following is a full, clear, and exact description thereof, which will enable others skilled in the art to which it appertains to make and use the same.

This invention relates to certain improvements in refrigerating-chambers; and the invention consists in making the ice-box with inclined sides, being larger at the bottom than at the top; also, providing the cooling-chamber with an umbrella to distribute the water evenly over said chamber, which latter is corrugated and made with inclined top and sides; also, the special arrangement and detail parts, all of which will be hereinafter more fully set forth.

In order to enable others skilled in the art to which my invention appertains to make and use the same, I will now proceed to describe its construction, arrangement, and operation, reference being had to the accompanying drawings, which form a part of this specification, and in which—

Figure 3:
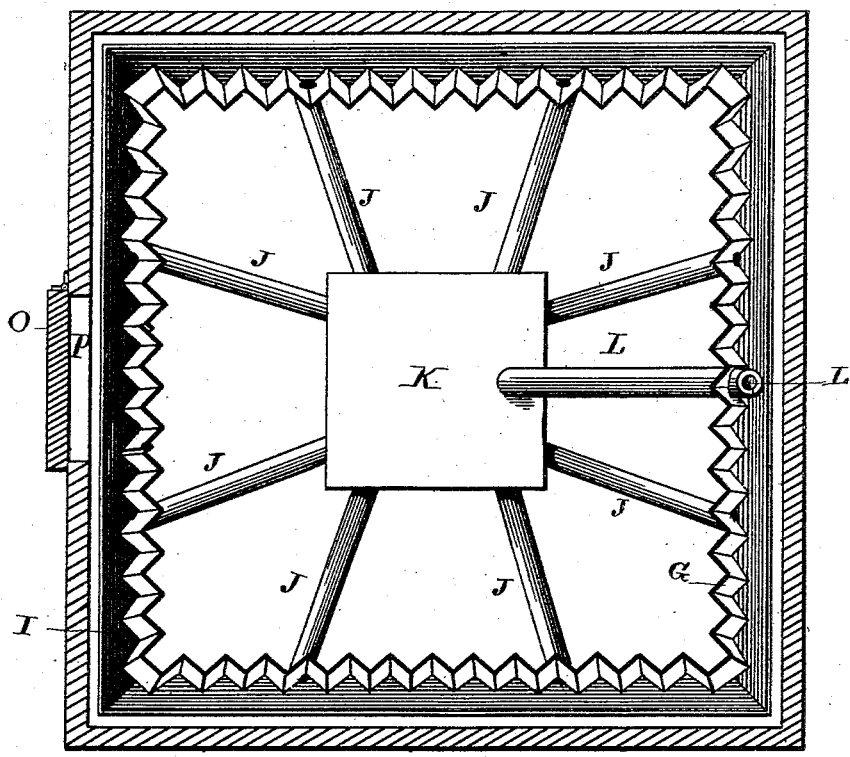
Figure 4:
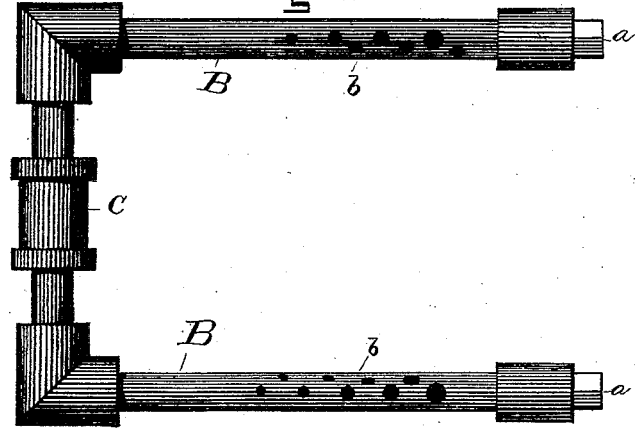

Figure 1 is a central vertical section through the reservoir, cooling-chamber, house, and ice-box. Fig. 2 is a top view of the ice-box. Fig. 3 is a section taken on the line *x x* of Fig. 1 through the house and cooling-chamber. Fig. 4 is a bottom view of the water-distributer placed in the ice-box, and Fig. 5 is a top view of the cooling-chamber.

A represents the ice-box. This box is made inclined outward from the top to the bottom on all its sides, and provided with a water-distributer, consisting of pipes B, having perforations *b*, connected together by a pipe, C. These perforations are placed on the under side of the pipes, and begin with a small hole near the pipe C. They increase in size, as shown in drawing, as they extend along the pipes toward the ends, so that the distribution of water will be equal, and are arranged in two rows—one row to throw the water down on the side or edge of the ice, and the other at an angle toward the center of the box. At the end of each pipe B is a screw-plug, *a*. The ice-box is provided with an overflow, D, arranged in any desired place, and as far from the bottom as may be desired. It is also provided with a strainer, E, to prevent any foreign matter from passing through into the water-escape or sprinkler E'. This ice-box A, in the drawing, is placed on top of the house F, over the cooling-chamber G. When in this position water is fed to the corrugated umbrella H, placed on top of the cooling-chamber. The cooling-chamber is also corrugated, and its top and sides made with an outward incline from top to bottom. Around the sides of the cooling-chamber is placed a trough, I, which catches the water, and by pipes J passes it to the reservoir K—shown in drawing arranged inside the cooling-chamber. From the reservoir K extends a pipe, L, connecting with a steam or hand pump, M, of any suitable construction. From the pump a pipe, N, extends, connecting with the pipe C of the water-distributer. The house F and cooling-chamber G are provided with doors O P at any desired place in said house and chamber.

When ice-boxes are made inclined inwardly from the top to the bottom, or with vertical sides, the ice is, by its top weight, jammed against the sides, causing it to remain above the body of water in the box. To obviate this difficulty I have given my ice-box an outward inclination from the top to the bottom, as shown.

When more water is required than passes through the perforations in the pipes B the plugs *a*—one or both—are removed to supply the extra amount of water. In case the strainer E in the bottom of the ice-box becomes stopped up, and the flow of water impeded, the overflow D, after the water raises to its height, will afford a means of escape for the accumulating water.

The cooling-chamber may be constructed in any suitable way, provided it has an incline given the top in all directions from the center, as shown. This top may be made convex or given a slant, to conform to the sides. The sides are also given an inclination from the top downward, so that the water may at all times pass over and in contact with its surface, and not drop clear of it from icicle or other accretions. The umbrella is given an incline corresponding to that of the top of the cooling-chamber, and is arranged thereon in any suitable manner. Its use has been found to prevent "sweating" on the inside of the cooling-chamber. The trough I is placed at or near the bottom of the cooling-chamber for catching the water after it has passed over said chamber. The water is then, by pipes J, conveyed to a reservoir, K, which may be constructed in any suitable manner, either within or without the cooling-chamber.

The operation is as follows: A certain amount of water is placed in the ice-box with the ice. At the same time it begins to pass through the strainer E and sprinkler E'. The sprinkler distributes the water evenly on the apex of the umbrella, which conveys it to the top of the cooling-chamber, near the sides, from whence it passes to and down the sides to the trough I, and by the pipes J to the reservoir K. From this reservoir it is drawn through the pipes L by a pump and forced up through the pipe N into the pipe C of the water-distributer in the ice-box, thus continuously cooling the water, passing it over the cooling-chamber, and forcing it back again into the ice-box, to be re-cooled and passed down again.

The water, when desired, may be pumped from other sources into the ice-box, and, after passing over the cooling-chamber, be allowed to pass off.

I would have it understood that I do not confine myself to the special arrangement shown in the drawing, as the ice-box may be placed down at one side, or below the cooling-chamber, and the water pumped from the ice-box up, and down on the umbrella.

Having thus fully described my invention, what I claim as new, and desire to secure by Letters Patent, is—

1. The combination, with the ice-box A, having all sides inclined outwardly, as shown, of the water-distributer, consisting of perforated pipes B, the pipe C, strainer E, and sprinkler E', all constructed and operating substantially in the manner shown and described.

2. A corrugated cooling-chamber having inclined top and sides, provided with an umbrella for equally distributing the water down all sides, substantially as set forth.

3. The corrugated cooling-chamber G, in combination with umbrella H, trough I, pipes J, and reservoir K, all constructed and arranged substantially in the manner shown and described.

In testimony that I claim the foregoing as my own I affix my signature in presence of two witnesses.

GEO. W. CORNELL.

Witnesses:
H. B. BROWN,
ALBIN M. LONG.